(12) United States Patent
Bare

(10) Patent No.: US 7,621,688 B2
(45) Date of Patent: Nov. 24, 2009

(54) SAFETY GUARD FOR POWER TAKE OFF

(76) Inventor: Allan Bare, 22 Williamson Road, Ingelburn, New South Wales (AU) 2560

( * ) Notice: Subject to any disclaimer, the term of this patent is extended or adjusted under 35 U.S.C. 154(b) by 461 days.

(21) Appl. No.: 11/448,429

(22) Filed: Jun. 7, 2006

(65) Prior Publication Data

US 2007/0147952 A1 Jun. 28, 2007

(30) Foreign Application Priority Data

Jun. 9, 2005 (AU) .............................. 2005202533

(51) Int. Cl.
*F16B 11/00* (2006.01)
(52) U.S. Cl. ........................... 403/23; 403/51; 403/314; 403/322.4
(58) Field of Classification Search .................. 403/23, 403/50, 51, 134, 314, 322.4; 464/170–178; 74/608–609
See application file for complete search history.

(56) References Cited

U.S. PATENT DOCUMENTS 4,663,984 A * 5/1987 Taylor ......................... 464/173
5,582,547 A * 12/1996 Offerhaus .................... 464/172

FOREIGN PATENT DOCUMENTS

| DE | 3906410 | 9/1990 |
| EP | 0611896 | 8/1994 |
| WO | WO9806955 | 2/1998 |

* cited by examiner

*Primary Examiner*—Victor MacArthur
(74) *Attorney, Agent, or Firm*—Kirton & McConkie; Michael F. Krieger; Adam Stevens

(57) ABSTRACT

A safety guard 10 has a guard body 12 shaped such that it will fit over the yoke 18 of a power take off shaft. The yoke 18 includes a groove 24 formed in an outer surface near the end 22. Safety guard bearing 26 is mounted to groove 24. Safety guard bearing 26 also has a groove 28 formed in an outer surface. Two levers 30 are pivotally mounted to the safety guard body 12 by pivot pins that extend through apertures 36 in the levers 30. One end of levers 30 has a camming member that includes a lobe 38. Due to the relative position of the pivot aperture 36 and the lobe 38, the lobe 38 acts as an over center cam. When lever 30 is in the locked position, lobe 38 extends into groove 28. Lever 30 also includes a locking tongue 46. When the lever 30 is moved to the locking position, locking tongue 46 also extends into groove 28 on safety guard bearing 26. Thus, locking tongue 46 provides a secondary locking mechanism to assist in maintaining the safety guard 10 on the safety guard bearing 26. Further, shoulder 48 abuts on the wall 52 of aperture 50 to thereby hold the lever in the locking position. Removal of the safety guard involves a simple hand-operated opening of levers 30, which then allows the guard to be slid away from the yoke of the power take off.

15 Claims, 4 Drawing Sheets

SAFETY GUARD FOR POWER TAKE OFF

RELATED APPLICATIONS

This application claims priority to Australian Patent Application Serial Number 2005202533, filed Jun. 9, 2005.

FIELD OF THE INVENTION

The present invention relates to a safety guard. The safety guard is especially suited for use with a power take off. However, it will be appreciated that the safety guard may also be used to cover any other rotating shaft or rotating joint. For convenience, the safety guard will be described with reference to its use with power take offs. However, it will be appreciated that the safety guard of the present invention should not be considered to be limited solely to use with power take offs.

BACKGROUND TO THE INVENTION

United States, European and Australian safety standards dictate that agricultural power take off shafts must be enclosed by an approved safety cover. Current Australian and United States standards allow for the safety cover to rotate with the shaft. However, the safety cover must stop rotating when it comes into contact with any object. This requirement is normally achieved by the use of a safety guard bearing between the safety guard and the power take off shaft.

Alternatively, the safety guard can be retained in a stationary position whilst the power take off shaft is operating. This is normally achieved by tying the safety guard to the tractor frame with a light duty chain.

European standards presently specify that the safety guard must not rotate with the power take off shaft. Thus, in Europe, the chained method described above is usually adopted.

Separate safety standards specify that tractors must be fitted with a metal power take off master guard. The metal master guard effectively covers the attaching end of the power take off shaft and a portion of the power take off shaft guard.

Power take off shafts typically incorporate a groove in the outer surface. Most current safety guards for use with power take offs have a safety guard bearing that has a flange or projection that rests in the groove in the power take off. For example, the safety guard bearing may comprise a split collar having a radially inwardly extending projection that resets in the groove on the power take off to thereby retain the split collar on the power take off.

In one presently commercially available power take off safety guard, the split collar includes three outwardly extending lugs. The safety guard includes a guard body having an open end that can be slipped over the yoke of the power take off. The guard extends away from the tractor to cover the power take off shaft.

In order to retain the guard on the power take off shaft, the guard body is provided with three openings that can receive the three lugs on the safety guard bearing. When the lugs from the safety guard bearing are inserted into the opening, the safety guard can be rotated so that the lugs move to a position in which it is not possible to remove the guard body from the lugs. In order to prevent the safety guard rotating back to a position at which the lugs can be removed from the body, a blocking member or stop member is inserted into place to stop relative rotation between the lugs and the guard body.

Other power take off safety guards currently available allow release of the safety guard by removal of snap ring, release of screw locks, compression of snap locks or removal of separate lock keys. All these methods for releasing the safety guard require the use of tools. It will be appreciated that such tools may not always be readily available.

A further disadvantage of known safety guards resides in those safety guards utilising separate locks that can become lost in the field.

BRIEF DESCRIPTION OF THE INVENTION

In a first aspect, the present invention provides a safety guard for a power take off comprising a guard body for positioning over the power take off, at least one locking member mounted to the guard body and being movable between a locked position and an unlocked position, the at least one locking member having at least one locking portion that extends into a groove present on the power take off or present on a guard bearing member mounted to the power take off when the at least one locking member is in the locked position to thereby lock the guard onto the power take off, the at least one locking portion being removed from the groove when the locking member is in the unlocked position, wherein the at least one locking member comprises at least one lever pivotally mounted to the guard body.

It is envisaged that normal use of the safety guard in accordance with the present invention will incorporate use of a safety guard bearing member positioned on the power take off, with the safety guard bearing member incorporating a groove on an outer surface thereof. For convenience, the present invention will hereinafter be described with reference to its use on a power take off fitted with a safety guard bearing member.

The at least one lever preferably comprises two levers. Each lever suitably includes a camming portion at one end, the camming portion including a lobe that extends into the groove when the lever is in the locked position, the lobe being clear of the groove when the lever is in the unlocked position. The lobe is preferably in an over-centre position when it is in the groove, which assists in maintaining the lobe in the groove.

Preferably, each lever includes a further locking portion, the further locking portion extending into the groove when the lever is in the locking position. More preferably, the further locking portion includes engagement means that engages with part of the guard body to hold the lever in the locking position. The further locking portion may include a locking tongue that extends into the groove when the lever is in the locking position.

The guard body may be provided with at least one recess or groove which houses the at least one lever when the at least one lever is in the locking position. Suitably, the at least one lever rests in the at least one recess such that the lever does not protrude beyond the outermost surface of the guard body when in the locked position. In this manner, the levers cannot be dislodged by flying debris from implements driven by the power take off. This provides a further safety feature of the safety guard of the present invention.

The levers are preferably hand operated levers. This avoids the necessity of carrying tools to operate or release the safety guard.

The guard body may be provided with an internal shoulder that contacts a surface of the safety guard bearing member to thereby accurately position the locking members relative to the groove in the safety guard bearing member. In this fashion, the safety guard may be easily fitted by simply sliding the safety guard along the power take off shaft until the internal shoulder contacts the surface of the safety guard bearing member (which would typically be the rear surface, relative to the tractor, of the safety guard bearing member). When the internal shoulder of the safety guard body contacts the surface of the safety guard bearing member, the locking members will overlie the groove on the safety guard bearing member. This ensures easy alignment of the locking members with the groove.

The guard body may be a body having an open mouth at one end. The guard body is suitably shaped such that it covers a substantial part of the yoke of the power take off and extends down to cover at least part of the shaft of the power take off. Alternatively, the guard body may substantially cover the yoke of the power take off and a separate shaft guard attached to or attachable to the guard body may cover the power take off shaft.

DETAILED DESCRIPTION OF THE DRAWINGS

The drawings attached to this specification have been provided for the purposes of illustrating embodiments of the present invention. It will be appreciated that the present invention should not be considered to be restricted solely to the embodiments as shown in the attached drawings.

Figure 2:
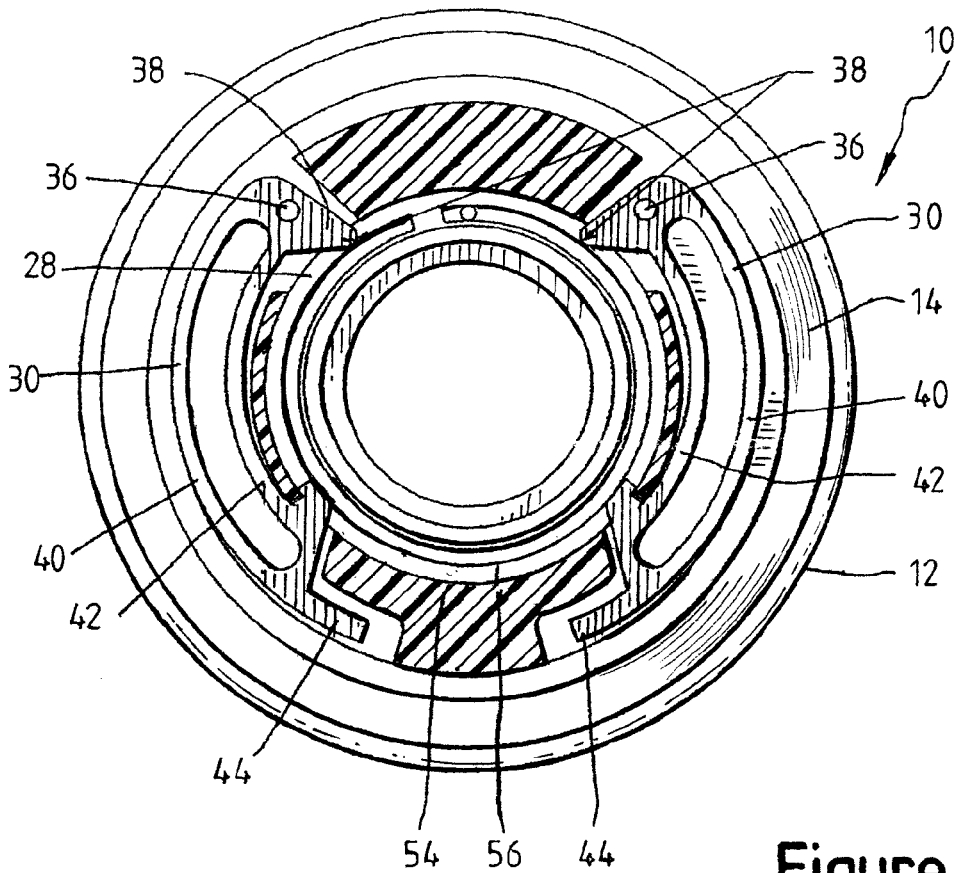
FIG. 2 shows a cross-sectional plan view of the safety guard shown in FIG. 1, with the safety guard being in the locked position.
Figure 3:
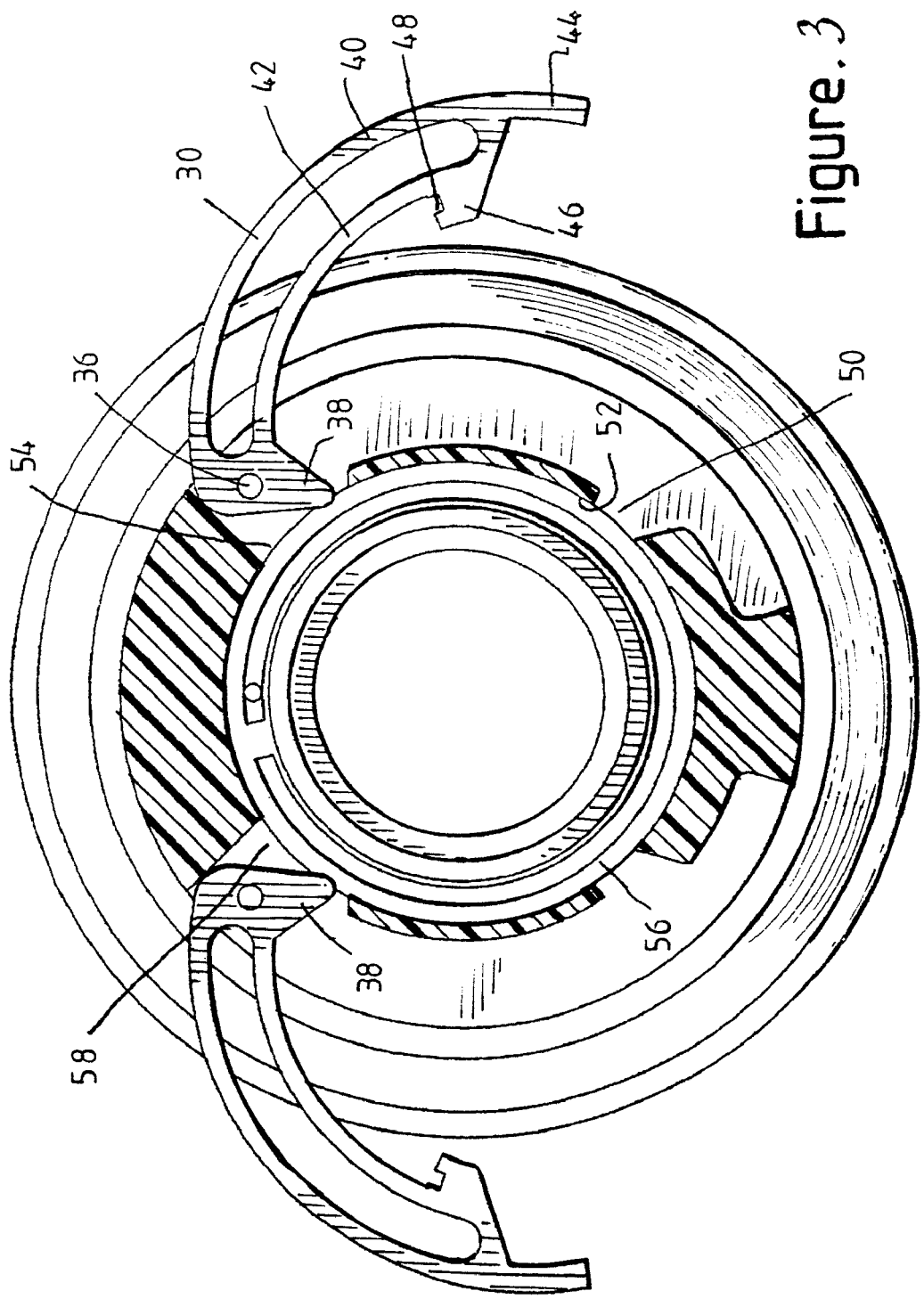
FIG. 3 shows the same view as FIG. 2 but with the safety guard in the unlocked position.
Figure 4:
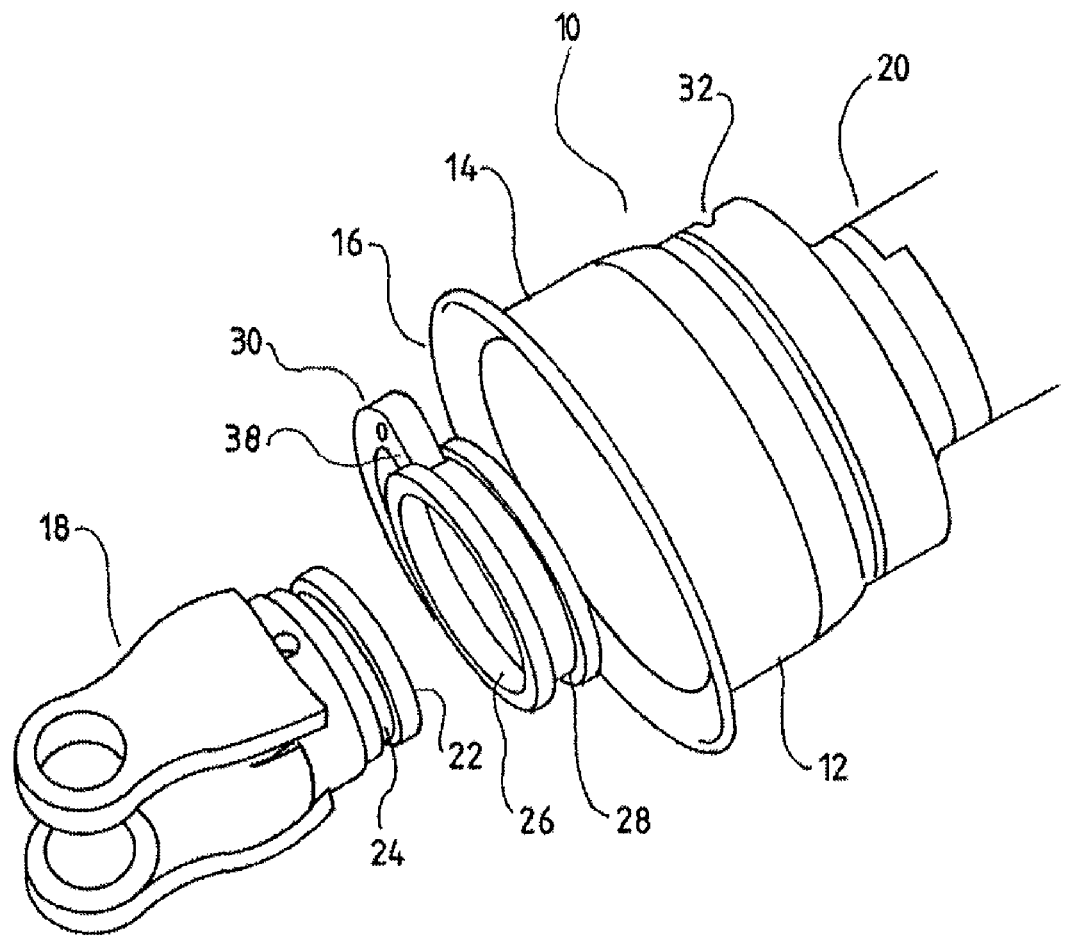
FIG. 4 shows a perspective view of the safety guard in accordance with an embodiment of the present invention and a yoke of a power take off, with the various parts of the yoke and the safety guard being shown separated from each other for clarity.

FIGS. 1 to 4 show various views of an embodiment of the present invention. Referring initially to FIG. 4, the safety guard 10 has a guard body 12. Guard body 12 is suitably manufactured from a rigid plastics material, such as polypropylene. The guard body 12 includes an enlarged portion 14 having an open mouth 16. The enlarged portion 14 is shaped such that it will fit over the yoke 18 of a power take off shaft. The guard body 12 also includes another portion 20 that fits over the shaft of the power take off. In this regard, it will be appreciated that the yoke 18 of the power take off shaft has an elongate shaft extending from end 22 of the yoke. The elongate shaft has been removed from FIG. 4 for clarity.

The yoke 18 will typically include a groove 24 formed in an outer surface near the end 22. This is typical part of most power take off yokes currently available for purchase.

The safety guard 10 must be able to be arranged such that it can remain stationary whilst the power take off shaft is rotating. This is normally achieved in practice by using a light weight chain to attach the safety guard 10 to the body of the tractor. In order to facilitate relative rotation between the power take off shaft and the safety guard 10, it is convenient to provide a safety guard bearing 26. Safety guard bearing 26 is conveniently in the form of a split collar having an internal projection that rests in groove 24 to thereby retain the safety guard bearing 26 on the power take off shaft whilst allowing the power take off shaft to rotate within the bearing. This construction is well known to a person skilled in the art and need not be described further.

The safety guard bearing 26 also includes a groove 28 formed in an outer surface thereof. Groove 28 may be machined into the surface of the safety guard bearing but, more preferably, it is formed during moulding to make the safety guard bearing. The safety guard bearing is made from a suitable bearing material having relatively low friction and good resistance to wear. The safety guard bearing may be made from a plastics material, such as nylon or the like.

FIG. 4 also shows a lever 30 that can be used to lock into the groove 28 on safety guard bearing 26. Lever 30 is normally mounted in recess 32 formed in guard body 12. However, in FIG. 4, the lever 30 is shown in a position removed from recess 32. This has been done solely for the purposes of clarity in demonstrating how the lever 30 can interact with the groove 28 of the safety guard bearing 26. In practice, it will be appreciated that the lever 30 is, in fact, mounted to the guard body 12 and that the lever 30 is not normally removed from the guard body 12.

Figure 1:
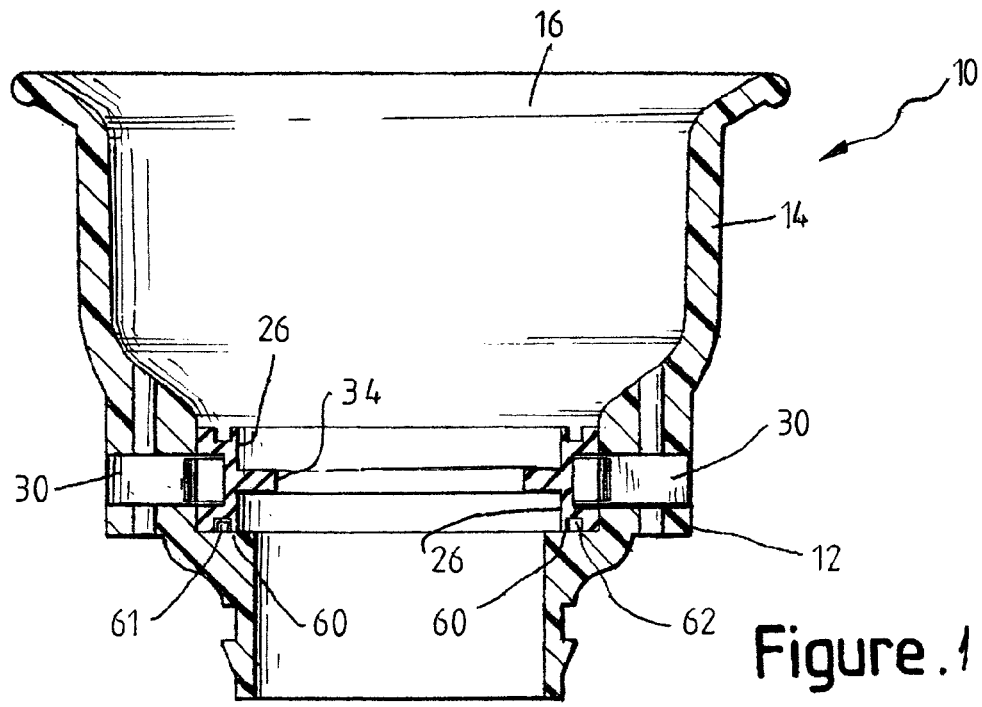
FIG. 1 shows a cross-sectional side view of a safety guard in accordance with an embodiment of the present invention.

Turning now to FIGS. 1, 2 and 3, the safety guard bearing 26 is shown more clearly, with inwardly extending projection 34, which when the safety guard bearing 26 is fitted to the power take off shaft, rests in groove 24, being clearly shown.

As can be seen from FIGS. 1, 2 and 3, the safety guard 10 includes two levers 30. The levers 30 are pivotally mounted to the safety guard body 12 by pivot pins that extend through apertures 36 in the levers 30. One end of levers 30 has a camming member that includes a lobe 38. Due to the relative position of the pivot aperture 36 and the lobe 38, the lobe 38 acts as an over centre cam.

FIG. 2 shows the levers 30 in the locked position. In the position shown in FIG. 2, the lobes 38 extend into the groove 28 on the safety guard bearing 26. The lobe moves by an over-centre action. Returning to FIG. 4, the position of lobe 38 relative to groove 28 when the lever 30 is in the locking position can be more clearly seen. As the lever 30, which is pivotally mounted to the guard body 12, has a lobe 38 that rests in the groove 28 of safety guard bearing 26 when the lever 30 is in the locked position, axial removal of the safety guard 10 from the safety guard bearing 26 is prevented.

Returning now to FIG. 3, it can be seen that the lever 30 includes two lever arms 40, 42 which are separated from each other by a space. This has been provided to give increased flexibility to the lever 30. This arrangement of two arms may not be required in practice and the present invention also encompasses levers having single arms, or indeed, any number of arms. The lever 30 includes a tab 44 positioned at the end of the lever 30 located opposite to the pivot point 36. The lever 30 also includes a locking tongue 46 that has a shoulder 48. When the lever 30 is moved to the locking position, locking tongue 46 moves through aperture 50 such that locking tongue 46 also extends into groove 28 on safety guard bearing 26. Thus, locking tongue 46 provides a secondary locking mechanism. Lobe 38 and tongue 46 effectively provide two tongues per lever to absorb axial loads between the safety guard and the safety guard bearing 26 when lever 30 is in the locked position. Further, shoulder 48 abuts on the wall 52 of aperture 50 to thereby hold the lever in the locking position.

In FIGS. 2 and 3, it will be appreciated that the outer rim of the safety guard bearing 26 is denoted by reference numeral 54 and the inner wall of groove 28 is denoted by reference numeral 56. As shown in FIG. 2, with the levers 30 in the locking position, both the lobes 38 and the locking tongues 46 of the levers 30 are positioned in the groove 28 of the safety guard bearing 26. Thus, the locking portions 38, 46 of the levers 30 lock the safety guard to the safety guard bearing groove when the levers 30 are in the locked position.

If it is desired to remove the safety guard 10 from the power take off shaft, an operator places his finger underneath tab 44 and flexes the lever 30 to thereby move the shoulder 48 on locking tongue 46 away from the wall 52 of the aperture 50 in the guard body 12. The lever can then be rotated to move the lobe 38 out of the groove 28 by an over-centre action. In this position, the locking portions of the levers are moved out of the groove and the safety guard 10 can be axially slid away from the safety guard bearing (and the yoke of the power take off shaft).

As shown more clearly in FIG. 3, the lobes 38 of levers 30 are positioned so that they are movable through an aperture 58 in the guard body 12.

It is desirable that the levers 30, when in the locked position, sit in a recess such that the levers 30 form a flush surface with the outer surface of the guard body 12 or even sit underneath the outer surface of the guard body 12. This assists in minimising the danger of flying debris from implements powered by the power take off from inadvertently unlocking the levers.

As shown most clearly in FIG. 1, the inner part of the guard body is provided with a shoulder 60. When the safety guard 10 is fitted to the power take off, the shoulder 60 comes into abutment with a rear surface of the safety guard bearing 26. Shoulder 60 carries a projection 61 which sits within a groove 62 in the rear surface of the safety guard bearing 26. This groove incorporates an abutment to prevent the bearing 26 from further rotating within the safety guard housing when projection 61 contacts the abutment in the groove 62. The levers 30 are positioned in the safety guard 10 such that when the shoulder 60 abuts on the rear surface of the safety guard bearing 26, the lobes 38 of levers 30 and the locking tongues 46 of levers 30 are positioned such that they overlie the groove 28 of the safety guard bearing 26. Thus, operating the levers 30 to move into the locking position then moves the locking portions of the levers 30 into the groove 28 of the safety guard bearing 26.

As is also shown in FIGS. 2 and 3, the two levers 42 open in opposite directions. This provides an additional measure that minimises inadvertent opening of the levers by flying debris or obstructions. For example, if an obstruction accidentally opens one of the levers, due to the levers having to move in opposite directions to open the levers, the other lever is much less likely to be opened by the obstruction.

Figure 5:
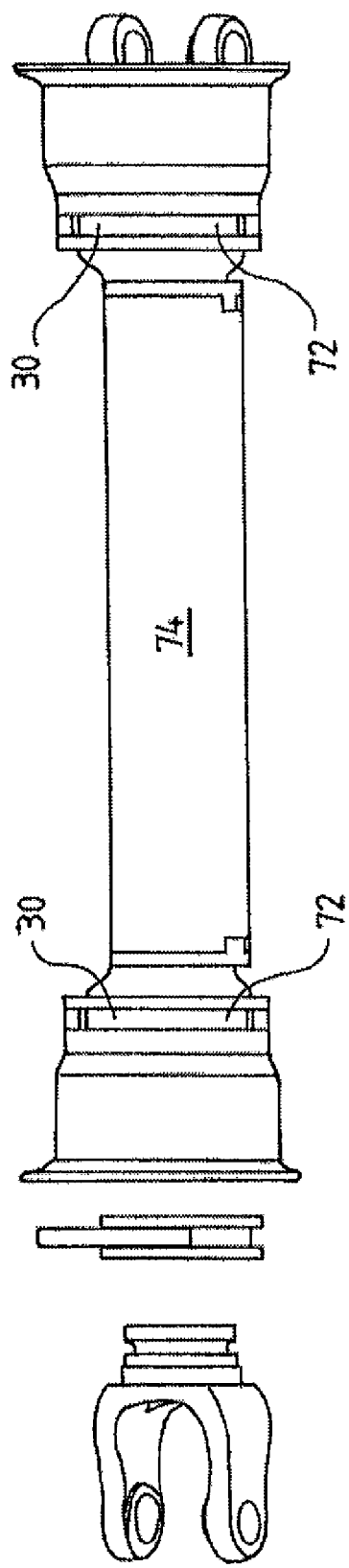
FIG. 5 shows a side view of a safety guard in accordance with another embodiment of the present invention.

FIG. 5 shows a safety guard in accordance with another embodiment of the present invention. The safety guard 70 shown in FIG. 5 includes two guard bodies 12', which are essentially identical to the guard body 12 shown in FIGS. 1 to 4. An identical locking mechanism to that shown in FIGS. 1 to 4 is provided on each guard body 12'. Levers 30' rest in recesses 72 formed in the outer surface of the guard bodies 12'. A shaft guard 74 is positioned between respective guard bodies 12' to guard a rotating shaft of the power take off.

In FIG. 5, one yoke 18' is shown protected by one of guard bodies 12'. It will be appreciated that the other guard body 12' can also protect another yoke (not shown). It will be appreciated that both the power take off shaft and the safety guard include telescoping sections which are easily separated. The power take off shaft has inner and outer metal drive members, whilst the safety guard has inner and outer plastic tube sections. The power take off shaft shown in FIG. 5 may be separated into two pieces for assembly through the safety guard tubes. Similarly to move one of the guard bodies 12' away from the associated yoke, the guard is unlocked and the guard tube members moved telescopically inwards relative to each other.

The safety guard in accordance with the embodiments of the present invention shown in the attached drawings utilises two large circumferentially located levers positioned at the back of the safety guard body. These easily accessible levers are housed in a counter sunk groove to provide a smooth, projection-free outer surface to comply with possible future safety requirements and preclude damage or displacement by flying debris. The pair of locking levers can be opened by use of a finger or thumb, thereby avoiding the necessity to use tools to unlock the safety guard. As the levers are closed or moved to a locking position, a secondary locating tongue on each lever is engaged to provide an additional safety factor. The cam lobes and locking tongue on each lever provide a total of four retaining lugs to absorb the higher axial forces between the guard and the shaft that are encountered during use. In contrast, most current safety guards utilise only two or three axial load retainers.

Embodiments of the present invention allow non-skilled operators to quickly remove and replace the safety guard from the power take off shaft without requiring the use of tools. The guard locking mechanism is integral (because the locking levers are mounted to the guard body) so that there are no separate locking parts that can be lost in the field. Fast operator removal of the safety guard allows the operator to easily fit the power take off shaft to the tractor. Direct access to the power take off shaft universal joint facilitates daily greasing of the power take off shaft universal joints. Large, easy to operate, counter sunk hand levers are unlikely to be dislodged by flying debris from power take off driven implements.

Those skilled in the art will appreciate that the present invention is susceptible to variations and modifications other than those specifically described. It is to be understood that the present invention encompasses all such variations and modifications that fall within its spirit and scope.

The claims defining the invention are as follows:

1. A safety guard operatively connected to a power take off shaft, the power take off shaft having one or both of a groove thereon and a guard bearing member mounted thereon, the guard bearing member having a groove thereon, the safety guard comprising:

a guard body positioned over the power take off shaft to thereby at least partly cover the power take off shaft;

at least one locking member mounted to the guard body and being movable between a locked position and an unlocked position, the at least one locking member comprising:

at least one locking portion that extends into the groove present on the power take off shaft or present on the guard bearing member mounted to the power take off shaft when the at least one locking member is in the locked position to thereby lock the guard body onto the power take off shaft, the at least one locking portion being removed from the groove when the locking member is in the unlocked position; and at least one hand operated lever pivotally mounted to the guard body;

wherein pivotal movement of the at least one lever moves the locking portion between the locked position and the unlocked position.

2. A safety guard as claimed in claim 1 wherein the at least one lever comprises two levers.

3. A safety guard as claimed in claim 2 wherein the two levers open in opposite directions to each other.

4. A safety guard as claimed in claim 1 wherein the at least one lever includes a camming portion at one end, the camming portion including a lobe that extends into the groove when the lever is in the locked position, the lobe being clear of the groove when the lever is in the unlocked position.

5. A safety guard as claimed in claim 1 wherein the at least one lever includes a further locking portion, the further locking portion extending into the groove when the lever is in the locking position.

6. A safety guard as claimed in claim 5 wherein the further locking portion includes en a meant means located at an end of the at least one lever located away from the locking portion, said further locking portion engaging with part of the guard body to hold the lever in the locking position.

7. A safety guard as claimed in claim 6 wherein the further locking portion includes a locking tongue that extends into the groove on the power take off shaft or the groove on the guard bearing member when the lever is in the locking position.

8. A safety guard as claimed in claim 6 wherein the at least one lever is curved, forming an arc between a point at which the lever is pivotally mounted to the guard body and the further locking portion.

9. A safety guard as claimed in claim 8 wherein the further locking portion includes engagement means movable from the locking position to the unlocking position by flexing the lever and lifting an end of the lever at which the further locking portion is located.

10. A safety guard as claimed in claim 1 wherein the guard body is provided with at least one recess or groove which houses the at least one lever when the at least one lever is in the locking position.

11. A safety guard as claimed in claim 10 wherein the at least one lever rests in the at least one recess such that the lever does not protrude beyond an outermost surface of the guard body when the at least one lever is in the locked position.

12. A safety guard as claimed in claim 11 wherein the at least one lever is positioned beneath an outer surface of the guard body when the at least one lever is in the locked position.

13. A safety guard as claimed in claim 1 wherein the guard body is provided with an internal shoulder that contacts a surface of the safety guard bearing member to thereby accurately position the locking members relative to the groove in the safety guard bearing member.

14. A safety guard connected to a power take off shaft, the power take off shaft having a groove thereon, the safety guard comprising:
 a guard body positioned over the power take off shaft to thereby at least partly cover the power take off shaft; and
 at least one locking member pivotally mounted to the guard body, said at least one locking member comprising:
  at least one locking portion; and
  at least one hand operated lever;
 the at least one locking member being movable between a locked position at which the locking portion extends into the groove thereby to lock the guard body onto the power take off shaft and an unlocked position at which the locking portion is removed from the groove thereby allowing the guard body to be axially movable relative to the power take off shaft; and
 wherein the at least one locking member, when in the locked position, allows rotational movement of the guard body relative to the power take off.

15. A safety guard operatively connected to a power take off shaft having a guard bearing mounted to the power take off shaft, the guard bearing having a groove, the safety guard comprising:
 a guard body positioned over the power take off shaft to thereby at least partly cover the power take off shaft; and
 at least one locking member pivotally mounted to the guard body, said at least one locking member including at least one locking portion;
 the at least one locking member being movable between a locked position at which the locking portion extends into the groove thereby to lock the guard body onto the guard bearing and an unlocked position at which the locking portion is removed from the groove thereby allowing the guard body to be axially movable relative to the power take off shaft;
 the at least one locking member, when in the locked position, allowing rotational movement of the guard body relative to the power take off shaft; and
 wherein the at least one locking member is hand operated to cause movement of the at least one locking member between the locked position and the unlocked position, and between the unlocked position and the locked position.

* * * * *